US006917177B2

(12) United States Patent
Maeguchi et al.

(10) Patent No.: US 6,917,177 B2
(45) Date of Patent: Jul. 12, 2005

(54) ROBOT ARM MECHANISM

(75) Inventors: Yuji Maeguchi, Hyogo (JP); Takahiro Inada, Hyogo (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 116 days.

(21) Appl. No.: 10/366,233

(22) Filed: Feb. 13, 2003

(65) Prior Publication Data

US 2004/0085038 A1 May 6, 2004

(30) Foreign Application Priority Data

Feb. 14, 2002 (JP) ....................................... 2002-036349

(51) Int. Cl.[7] ................................................ B25J 18/00

(52) U.S. Cl. ............................ 318/568.11; 318/568.21; 74/490.01; 74/490.03

(58) Field of Search ...................... 318/568.11, 568.21; 74/490.01, 490.03

(56) References Cited

U.S. PATENT DOCUMENTS 5,049,029 A * 9/1991 Mitsui et al. ............ 414/744.5
5,222,409 A * 6/1993 Dalakian ................. 74/479.01
6,095,011 A * 8/2000 Brog.ang.rdh ........... 74/490.03
6,267,549 B1 * 7/2001 Brown et al. ............ 414/744.5
6,364,599 B1 * 4/2002 Suwa et al. .............. 414/744.1

FOREIGN PATENT DOCUMENTS

JP 60-113809 6/1985
JP 2001-138969 A1 5/2001

* cited by examiner

*Primary Examiner*—Rita Leykin
(74) *Attorney, Agent, or Firm*—Marshall, Gerstein & Borun LLP

(57) ABSTRACT

Provided is a robot arm mechanism that conveys and supports a work, which requires neither a traveling axis that demand a high installation accuracy nor a jig for fixedly supporting a work. A robot 1 includes: a parallel link mechanism 6 having a lower link 2 and an upper link 3, in which the lower link 2 and the upper link 3 are coupled with an arm 4 and an auxiliary link 5; a driving portion for driving one joint 12 of the lower link 2 in the parallel link mechanism; a parallel link mechanism 11 having a lower link 7 and an upper link 8 fixed on the upper link 3 in the parallel link mechanism 6, in which the lower link 7 and the upper link 8 are coupled with an arm 9 and an auxiliary link 10; a driving portion for driving one joint 15 of the upper link 8 in the parallel link mechanism 11; and an arm 17 fixed on the lower link 7 in the parallel link mechanism 11 and holding up an object for support.

10 Claims, 13 Drawing Sheets

1 6 14 8 15 3 9 17c 17b 17a 17 11 18 5 12 2 4 10 7

ROBOT ARM MECHANISM

FIELD OF THE INVENTION

The present invention relates to a robot arm mechanism used by a robot that conveys an object and supports the object at a conveying end, and more specifically to a robot arm mechanism using a parallel link mechanism.

BACKGROUND OF THE INVENTION

In a manufacturing facility for automobiles, for example, machining robots for machining works, such as welding, are provided on both sides of each of machining stages located at a plurality of locations on a conveying passage. A work is mounted on a pallet, and a fixing jig for positioning and fixing the pallet is provided at each of the stages. The work is conveyed, together with the pallet, to a fixing jig by conveying means such as carrying robot, where the work is fixed by the fixing jig and machined by a machining robot in the fixed state. After the machining is completed at the stage, the work is conveyed by conveying means to a next stage for another process.

A robot for use not only in welding but also in carrying a work is disclosed in Japanese Laid-open Patent Publication No. 2001-138969. This robot is engaged in a guiderail provided along a conveying passage and movable along the guiderail. Two of such robots are positioned on each side of the conveying passage, adding up to four of these robots. These welding robots weld a work, and each of the robots supports the work and move along the guiderail, thereby carrying the work to a next stage for another process.

However, in the case of the robot disclosed in Japanese Laid-open Patent Publication No. 2001-138969, the guiderail serving as a traveling axis is required to be horizontally leveled with a high degree of accuracy.

Also, in the case of the robot supporting a work with a pallet, a dedicated pallet has been required for each kind of work, for example, for each type of motor vehicle. Furthermore, in order that a pallet used once is reused, the pallet has been required to be re-circulated in a machining process.

SUMMARY OF THE INVENTION

Under these circumstances, the present invention has been made, and an object thereof is to provide a robot arm mechanism that does not require a traveling axis which demands a high degree of installing accuracy by configuring the robot arm mechanism to drive a joint in a quadric crank chain, such as parallel link mechanism, so as to convey a work and to support the work at a conveying end so as to machine the work.

Another object of the present invention is to provide a robot arm mechanism that does not require a jig for positioning, such as pallet, to be prepared differently for each kind of work and is capable of eliminating an extra labor such as circulation of a pallet by configuring the robot arm mechanism to directly support a work.

In order to solve the above problems, a robot arm mechanism according to the present invention is a robot arm mechanism used for a robot that conveys an object and supports the object at a conveying end, and the robot arm mechanism comprises: a first quadric crank chain having a lower link and an upper link, the lower link and the upper link being coupled with each other through links; a first driving portion for driving a joint of the lower link in the first quadric crank chain; a second quadric crank chain having a lower link and an upper link fixed on the upper link in the first quadric crank chain, the lower link and the upper link being coupled with each other through links; a second driving portion for driving a joint of the upper link in the second quadric crank chain; and a supporting portion fixed on the lower link in the second quadric crank chain and holding up an object from below to support the object.

In the above invention, preferably, the first and the second quadric crank chains are respectively constituted by parallel link mechanisms.

In the above case, preferably, the length of the links coupling the upper link and the lower link in the first quadric crank chain is longer than the length of the links coupling the upper link and the lower link in the second quadric crank chain.

In the above invention, preferably, the upper link in the second quadric crank chain is disposed farther upwardly than the upper link in the first quadric crank chain by a predetermined distance.

In the above invention, preferably, the supporting portion is arm-shaped extending vertically upwardly from the lower link.

In the above invention, preferably, the length of the supporting portion is longer than the length of the links coupling the upper link and the lower link in the second quadric crank chain.

In the above invention, preferably, the supporting portion has a joint for moving a supported object.

In the above invention, preferably, the supporting portion has, at its upper end, a supporting member for supporting an object at a plurality of portions of the supporting member. Furthermore, preferably, the supporting member is constituted such that the supporting portions for an object can be changed in a direction intersecting with a conveying direction and/or the conveying direction.

The above features, as well as other features and advantages of the present invention will become more apparent from the following description taken with reference to the accompanying drawings.

DETAILED DESCRIPTION OF THE PREFERRED EMBODIMENTS

Hereinbelow, robot arm mechanisms according to embodiments of the present invention will be described with reference to the drawings.

Figure 1:
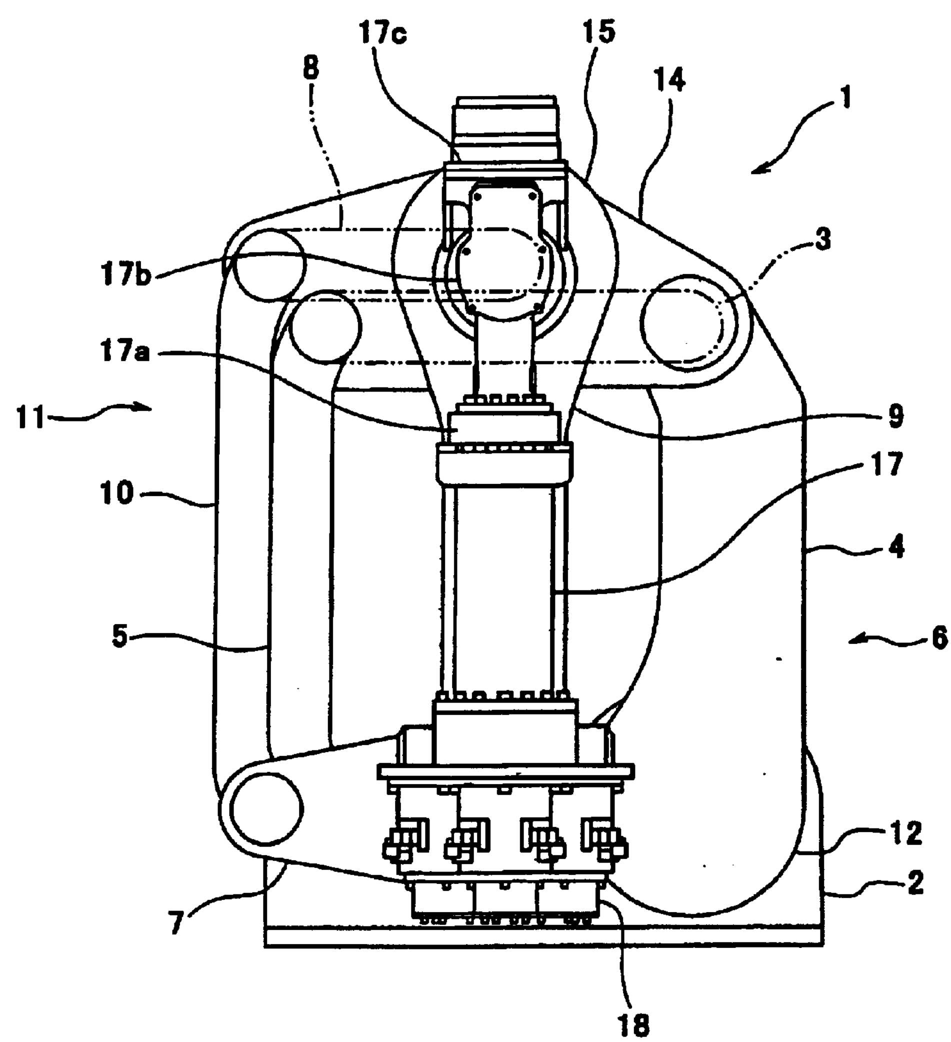
FIG. 1 is an overall front side view showing a robot using a robot arm mechanism according to an embodiment of the present invention.
Figure 2:
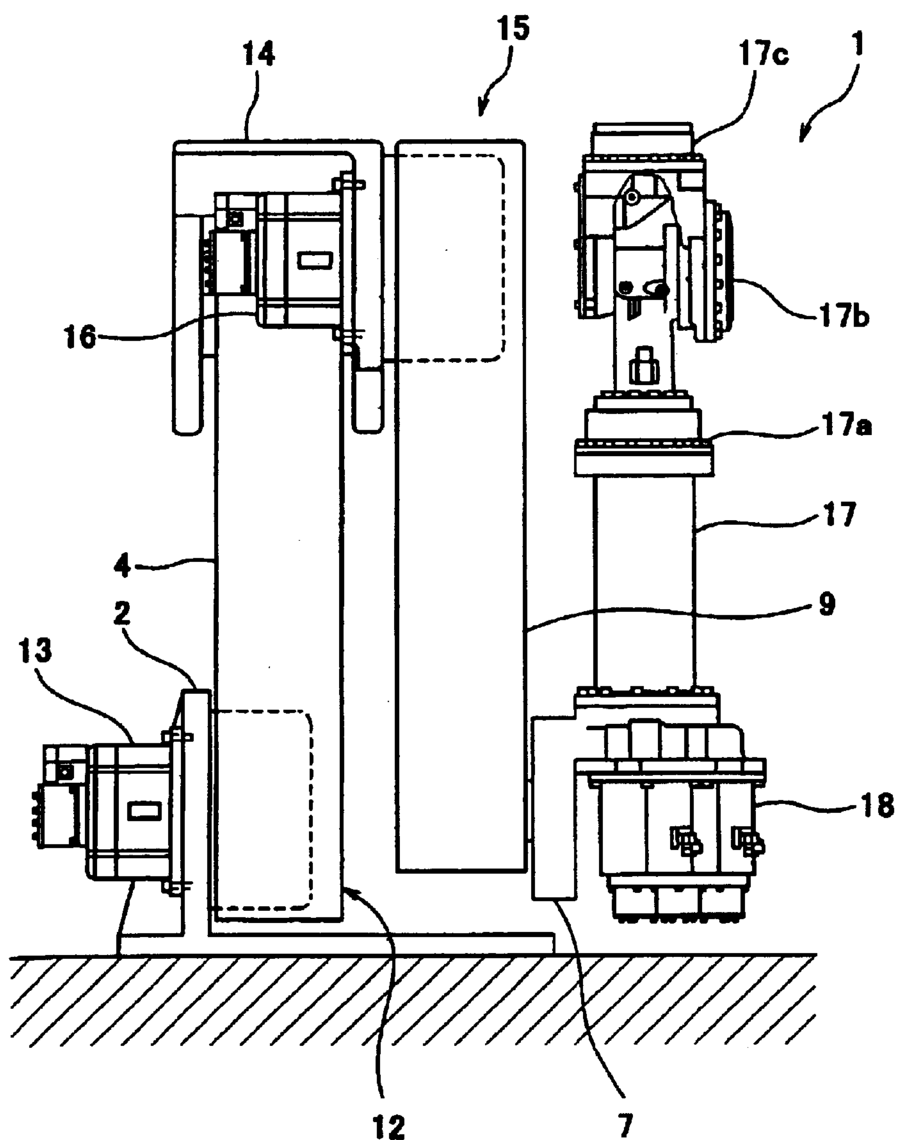
FIG. 2 is an overall side view showing the robot using the robot arm mechanism according to the embodiment of the present invention.

FIG. 1 is an overall front side view showing a robot using a robot arm mechanism according to an embodiment of the present invention, and FIG. 2 is an overall side view thereof. A robot 1 includes a parallel link mechanism 6 having a lower link 2, an upper link 3, an arm (link) 4, and an auxiliary link 5 and a parallel link mechanism 11 having a lower link 7, an upper link 8, an arm (link) 9, and an auxiliary link 10. The lower link 2 is horizontally disposed on an installing surface such as a floor in a plant, and a lower end of the arm 4 and a lower end of the auxiliary link 5 are hinged to both ends of the lower link 2. A joint 12 between the lower link 2 and the arm 4 is provided with a driving portion 13 including a motor and a speed reducer, and the joint 12 is driven by the driving portion 13.

Furthermore, an upper end of the arm 4 and an upper end of the auxiliary link 5 are both hinged to an upper link member 14, thus substantially constituting the upper link 3 between hinged positions of the upper link member 14 with the arm 4 and the auxiliary link 5. The link length of the lower link 2 is equal to that of the upper link 3, and the link lengths of the arm 4 and the auxiliary link 5 are also equal to each other. In the manner described above, the lower link 2, the upper link 3, the arm 4, and the auxiliary link 5 constitute the parallel link mechanism 6.

In the parallel link mechanism 6 thus constructed, the lower link 2 appears to be substantially L-shaped in a side view, and the arm 4 and the auxiliary link 5 are disposed on the front side of a vertical-plate shaped portion of the lower link 2. The upper link member 14 is hollow with its lower portion open and disposed so as to cover the upper ends of the arm 4 and the auxiliary link 5, thereby enabling the parallel link mechanism 6 to operate without the lower link 2, the arm 4, the auxiliary link 5, and upper link member 14 interfering with one another.

An upper end of the arm 9 and an upper end of the auxiliary link 10 are respectively hinged to two positions in a portion of the upper link member 14 at a predetermined distance above a portion of the upper link 3, thus substantially constituting the upper link 8 between these positions. That is, the upper links 3, 8 are integrally formed as the upper link member 14. In other words, the upper link 8 is fixed to the upper link 3.

The direction of a line formed by connecting the hinged positions of the arm 9 and the auxiliary link 10 to the upper link member 14 is in a horizontal direction. A lower end of the arm 9 and a lower end of the auxiliary link 10 are respectively hinged to both ends of the lower link 7. The link lengths of the lower link 7 and the upper link 8 are equal to each other, which are shorter than those of the lower link 2 and upper link 3. Furthermore, the link lengths of the arm 9 and the auxiliary link 10 are equal to each other, which are shorter than those of the arm 4 and the auxiliary link 5. In the manner described above, the parallel link mechanism 11 is constituted by the lower link 7, the upper link 8, the arm 9, and the auxiliary link 10.

In the parallel link mechanism 11, the arm 9 and the auxiliary link 10 are disposed on the front side of the upper link member 14, and the lower link 7 is additionally disposed on the front side of the arm 9 and the auxiliary link 10, thereby enabling the parallel link mechanism 11 to operate without the respective members interfering with one another. Furthermore, since the arm 9, the auxiliary link 10, and the lower link 7 are disposed on the front side of the upper kink member 14, these do not interfere with the members in the pareller link mechanism 6 during operatin.

A driving portion 16 constituted by a motor and a speed reducer is provided at a joint 15 between the upper link 8 and the arm 9, and this joint 15 is driven by the driving portion 16.

The arms 4, 9 respectively become thicker at portions thereof in the vicinities of the joints 12, 15 than their remaining portions. The respective ends of the auxiliary links 5, 10 are bent toward the arms 4, 9 to avoid any interferences with the joints 12, 15 of the arms 4, 9 and to ensure wider operating ranges.

An arm (a supporting portion) 17 is fixed to the front side of a joint portion of the lower link 7 that joins to the arm 9. The arm 17 has three joints 17*a*, 17*b*, and 17*c* and hence has three degrees of freedom. That is, the joint 17*a* is provided in a middle portion of the arm 17 and rotatable about a central axis of the arm 17. Furthermore, the joint 17*b* is provided in a portion of the arm 17 on a tip end side of the joint 17*a* in a bendable manner, and the joint 17*c* capable of rotating about the central axis is provided in a portion of the arm 17 on a tip end side of the joint 17*b*. In addition, a driving portion 18 such as motor is provided at a base end of the arm 17 to drive such joints 17*a*, 17*b*, 17*c*.

A robot 1 is capable of finely adjusting a position of a work supported by the robot at the tip end of the arm 17 through driving such joints 17*a*, 17*b*, 17*c*. Accordingly, the work can be accurately and fixedly supported at a required position even when the robot 1 is not disposed horizontally with a high degree of accuracy, thereby alleviating accuracy requirement of mounting the robot 1 on an installing surface.

Figure 3:
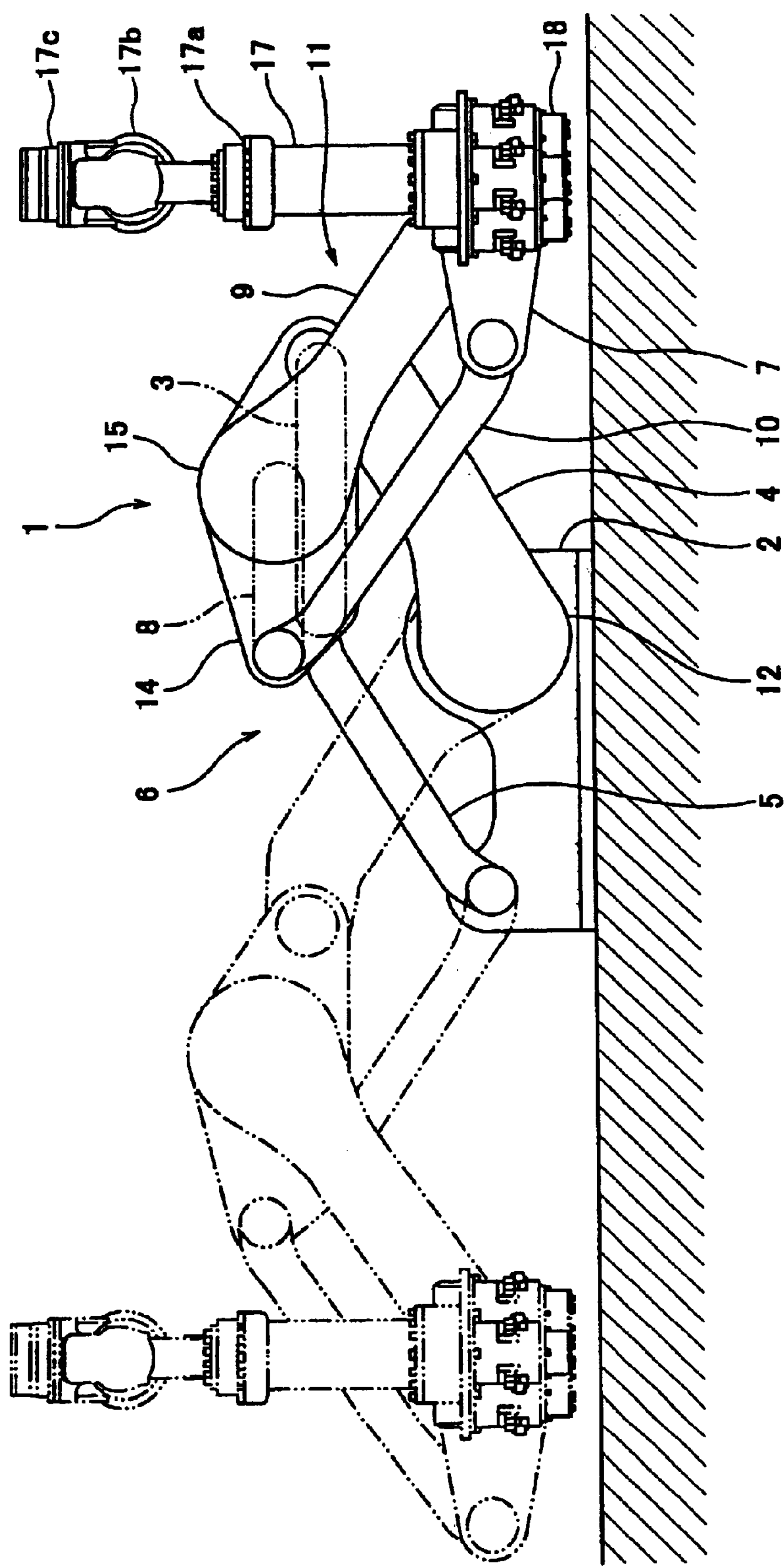
FIG. 3 is an overall front side view showing movement of the robot using the robot arm mechanism according to the embodiment of the present invention.

FIG. 3 is an overall front side view showing movement of a robot using the robot arm mechanism according to the embodiment of the present invention. The movement of the robot according to the embodiment of the present invention will be described with reference to FIG. 3. When the joint 12 is driven by the driving portion 13, the arm 4 is inclined in proportion to the amount driven. At this time, the auxiliary link 5 is inclined by the same angle as the arm 4, while maintaining a parallel relationship with the arm 4. Accordingly, the upper link member 14 moves around the joint 12 in a circular-arc shape, while remained in a horizontal position.

On the other hand, when the joint 15 is driven by the driving portion 16 through the similar operation described above, the lower link 7 moves around the joint 15 in a circular-arc shape, while remained in a horizontal position. For this reason, the arm 17 also moves integrally with the lower link 7, thereby enabling a work (not shown) supported by the arm 17 to be conveyed.

Figure 4:
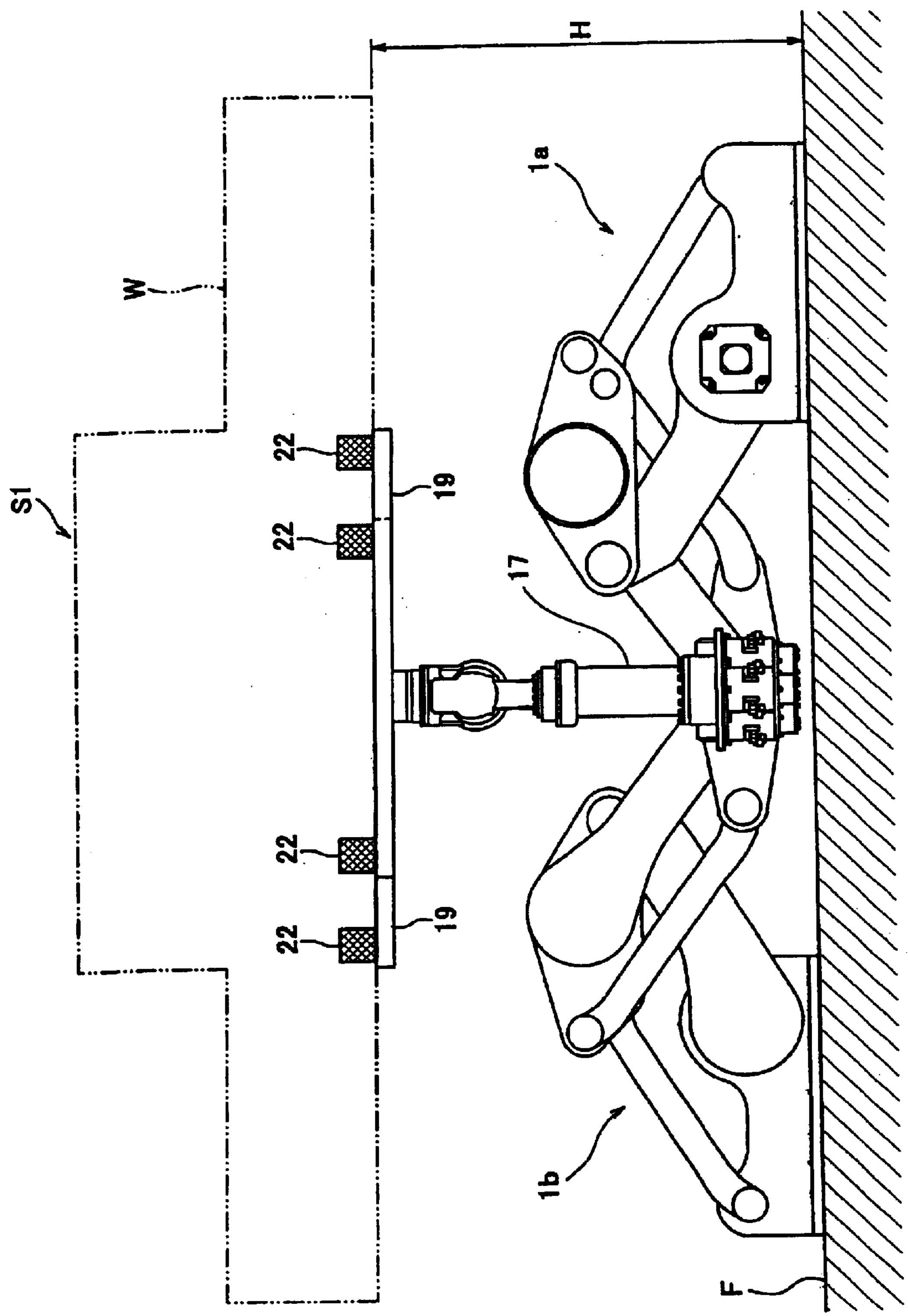
FIG. 4 is a front side view partially showing a constitution of a manufacturing facility of automobiles in the case where the robot according to the present embodiment is applied to the facility.
Figure 5:
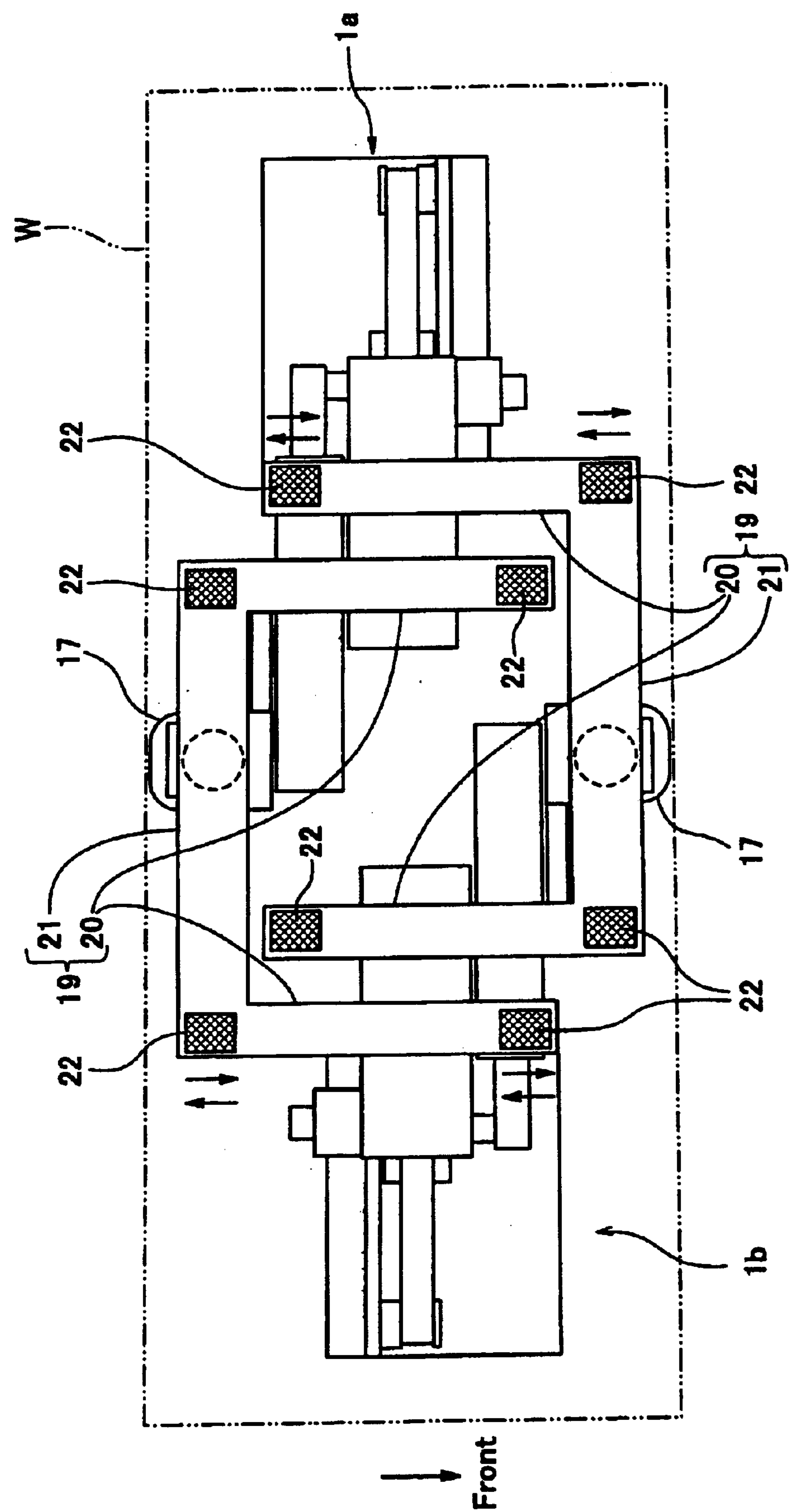
FIG. 5 is a plan view partially showing the constitution of the manufacturing facility of automobiles in the case where the robot according to the present embodiment is applied to the facility.

Next, an example in which the robot according to the present embodiment is applied to a manufacturing facility for automobiles will be described. FIG. 4 is a front side view partially showing a constitution of the present application example, and FIG. 5 is a plan view partially showing the constitution. In the present example, a case where the robot according to the present embodiment is applied to an existing manufacturing facility for automobiles will be described. Typically, a plurality of stages for a variety of machining are provided along a conveying passage for conveying a work W in a manufacturing facility for automobiles. At each stage, robots (not shown) for a variety kinds of machining are disposed. In such a stage, a work W is lifted upwardly by a height H from a plant floor F or the like, fixedly supported there by a fixing jig or the like, and then machined by the robots disposed on both sides of the passage.

In the present application example, fixing jigs are removed from the conveying passage, and robots 1*x*, 1*a*, 1*b*, 1*c*, 1*d* . . . are disposed on the conveying passage in this order starting from an upstream side of the conveying direction (FIGS. 6–9). FIGS. 4 and 5 show a disposition of the robots 1*a*, 1*b* at one stage S1. The robot 1*a* is disposed such that an arm 17 of the robot 1*a* is positioned on a rear side (back side of the view of FIG. 4), and the robot 1*b* is disposed such that an arm 17 of the robot 1*b* is positioned on a front side (front side of the view of FIG. 4).

As shown in FIG. 5, substantially channel-shaped supporting members 19 in plan are attached to tip ends of the arms 17 of the robots 1*a*, 1*b*. That is, each of the supporting members 19 is constituted by two bar shaped portions 20 extending in a front-back direction (a frontside-backside direction of the view of FIG. 4) and a bar-shaped portion 21 extending in a transverse direction (the conveying direction) to couple end portions of the bar-shaped portions 20. Furthermore, a supporting member 19 of the robot 1*a* is disposed such that a bar-shaped portion 21 of the robot 1*a* is positioned on the front side, and a supporting member 19 of the robot 1*b* is disposed such that a bar-shaped portion 21 of the robot 1*b* is positioned on the rear side.

Engaging portions 22 that protrude upwardly are provided on both ends of each bar-shaped portion 20 of the supporting member 19. The engaging portions 22 are engaged in holes (not shown) at corresponding positions provided in a bottom face of the work W, thereby fixing the work W. As shown in FIG. 5, the positions of the engaging portions 22 are adjustable in a longitudinal direction of the bar-shaped portion 20. When the kind of work is different such as due to different type of automobile and hence the positions of holes may be different, the positions of the engaging portions 22 can be adjusted so as to be adapted to the positions of the holes of a work W, thus supporting various kinds of works W.

The supporting member 19 of the robot 1*a* is fixed to the tip end of the arm 17 at a position of the bar-shaped portion 21 slightly to the robot 1*b* side (to the downstream side in the conveying direction) of the center of the bar-shaped portion 21. The supporting member 19 of the robot 1*b* is fixed to a tip end of the arm 17 at a position of the bar-shaped portion 21 slightly to the upstream side of the center of the bar-shaped portion 21 in the conveying direction. Furthermore, in the case of FIGS. 4 and 5, for the purpose of supporting the work W at a higher position than a floor F by a height H, the engaging portions 22 are engaged into the holes of the work W under the conditions where the supporting members 19 are disposed at the height H and spaced apart in the conveying direction so as to avoid any interference between the supporting members 19. In this way, one work W is machined while the work W is fixedly supported by two robots 1*a*, 1*b*.

Figure 6:
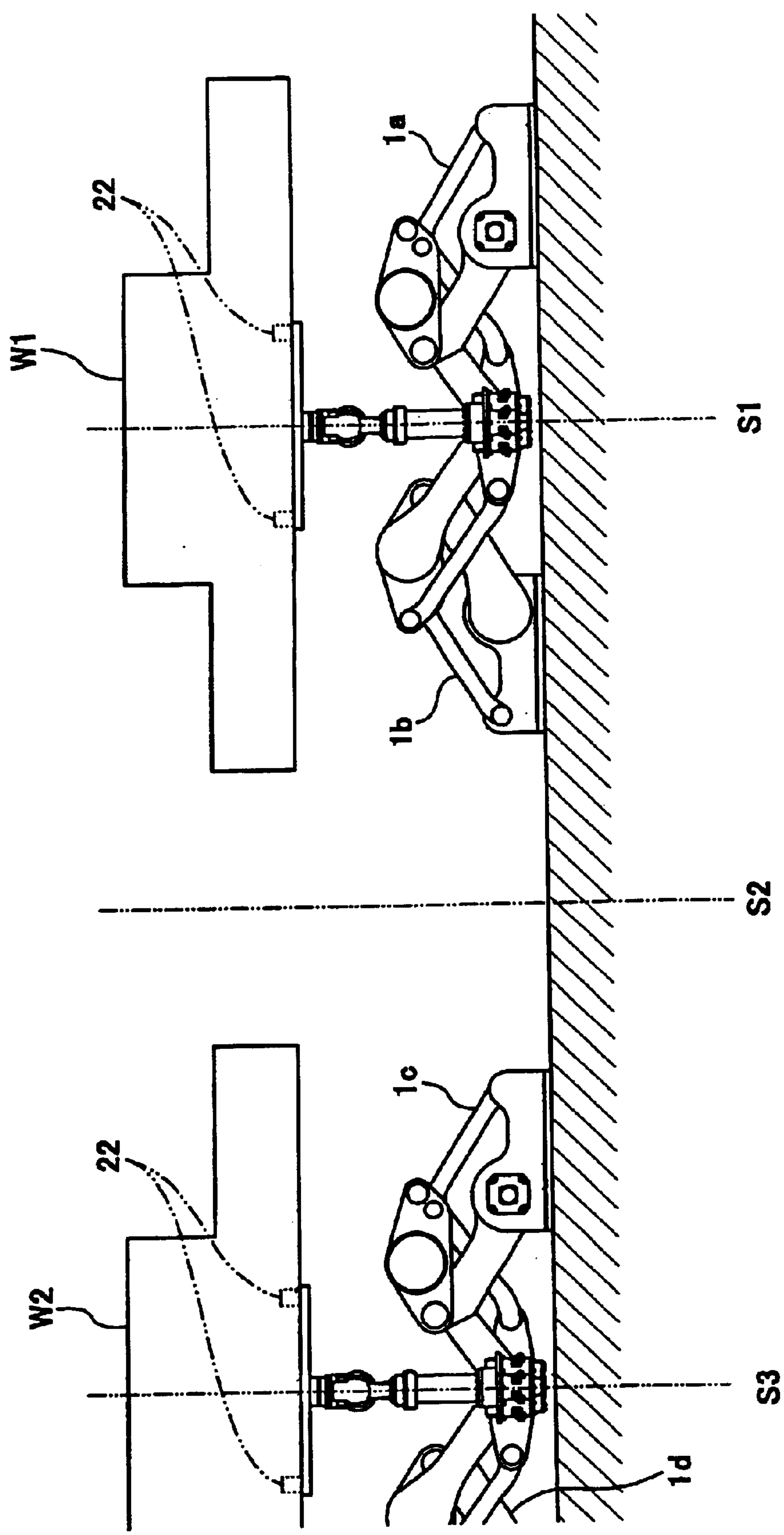
FIG. 6 is a front side view showing operations of the respective robots in the example in which the robot according to the present embodiment is applied to the manufacturing facility of automobiles.

FIGS. 6–9 are front side views showing operations of respective robots in the present application example, and operational states of the respective robots are shown from FIG. 6 to FIG. 9 in time series. In FIG. 6, a work W1 is fixedly supported by the robots 1*a*, 1*b* at a stage S1, and a work W2 is fixedly supported by the robots 1*c*, 1*d*, at a stage S3. A predetermined kind of machining is performed on the work 1 at the stage S1. Simultaneously, another predetermined kind of machining is performed on the work 2 at the stage S3. After the machining on the works W1, W2 are completed, the robot 1*b* conveys the work W1 from the stage S1 to a stage S2, and the robot 1*d* conveyed the work W2 from the stage S3 to a next stage (not shown).

Figure 7:
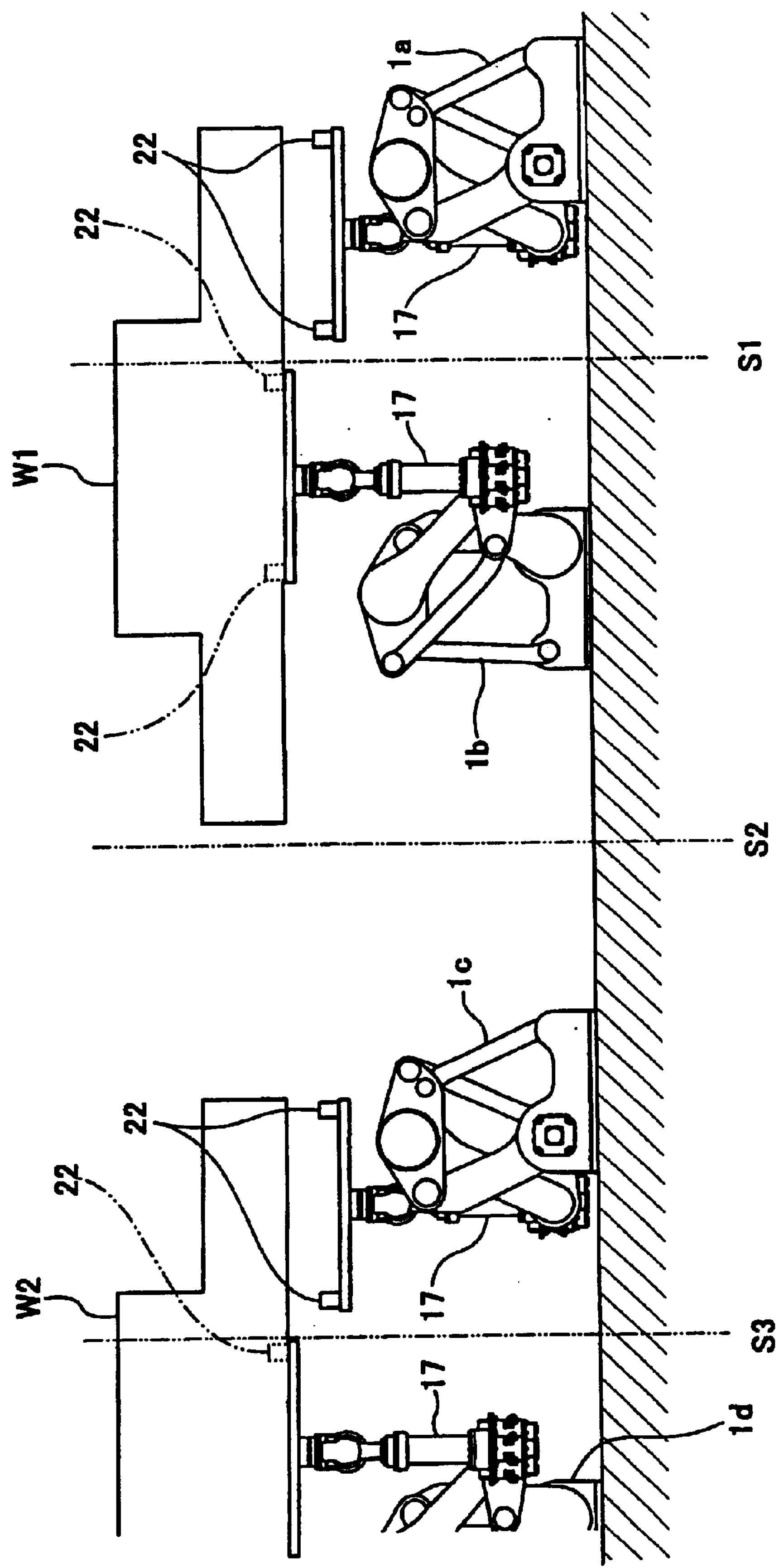
FIG. 7 is a front side view showing operations of the respective robots in the example in which the robot according to the present embodiment is applied to the manufacturing facility of automobiles.

As shown in FIG. 7, when the conveyance of the work W1 to the stage 2 is initiated, the robot 1*b* operates to lift up the arm 17 and simultaneously to move the arm 17 toward the downstream side in the conveying direction, thereby holding up the work W1, disengaging the work W1 from the engaging portion 22 of the robot 1*a*, and moving the work W1 toward the downstream side in the conveying direction. The robot 1*d* concurrently performs an operation similar to the operation described above, thereby moving the work W2 toward the downstream side in the conveying direction as well.

Figure 8:
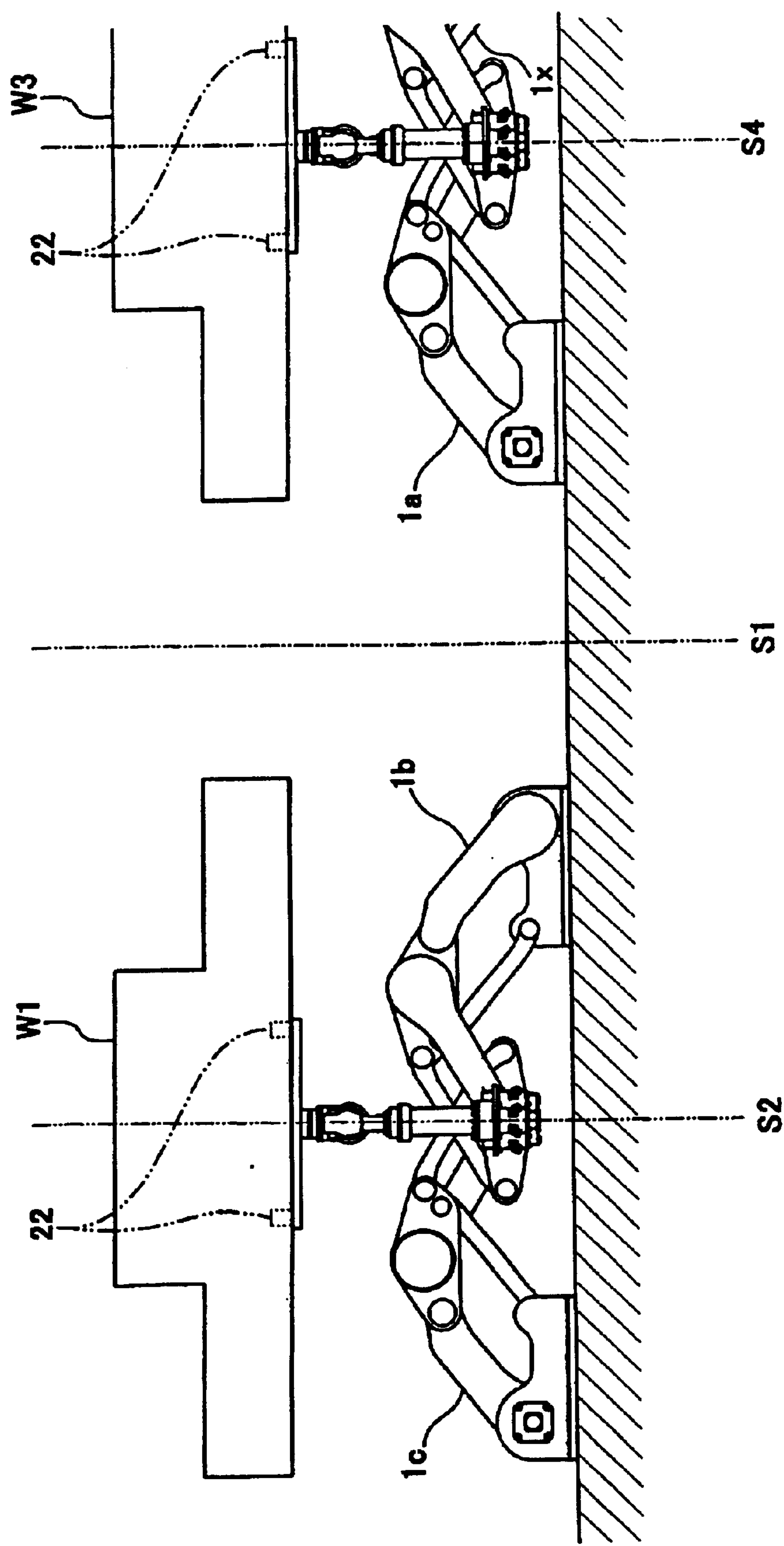
FIG. 8 is a front side view showing operations of the respective robots in the example in which the robot according to the present embodiment is applied to the manufacturing facility of automobiles.

The robots 1*a*, 1*c* respectively operate to move the arms 17 toward the upstream in the conveying direction so as to support works conveyed from the upstream side, thereby allowing the work W1 to be supported by the robot 1*b*, 1*c* at the stage S2. Similarly, a work 3 conveyed by a robot 1*x* is supported by the robots 1*x*, 1*a* at a stage S4 that is a process stage prior to the stage S1 (FIG. 8).

Figure 9:
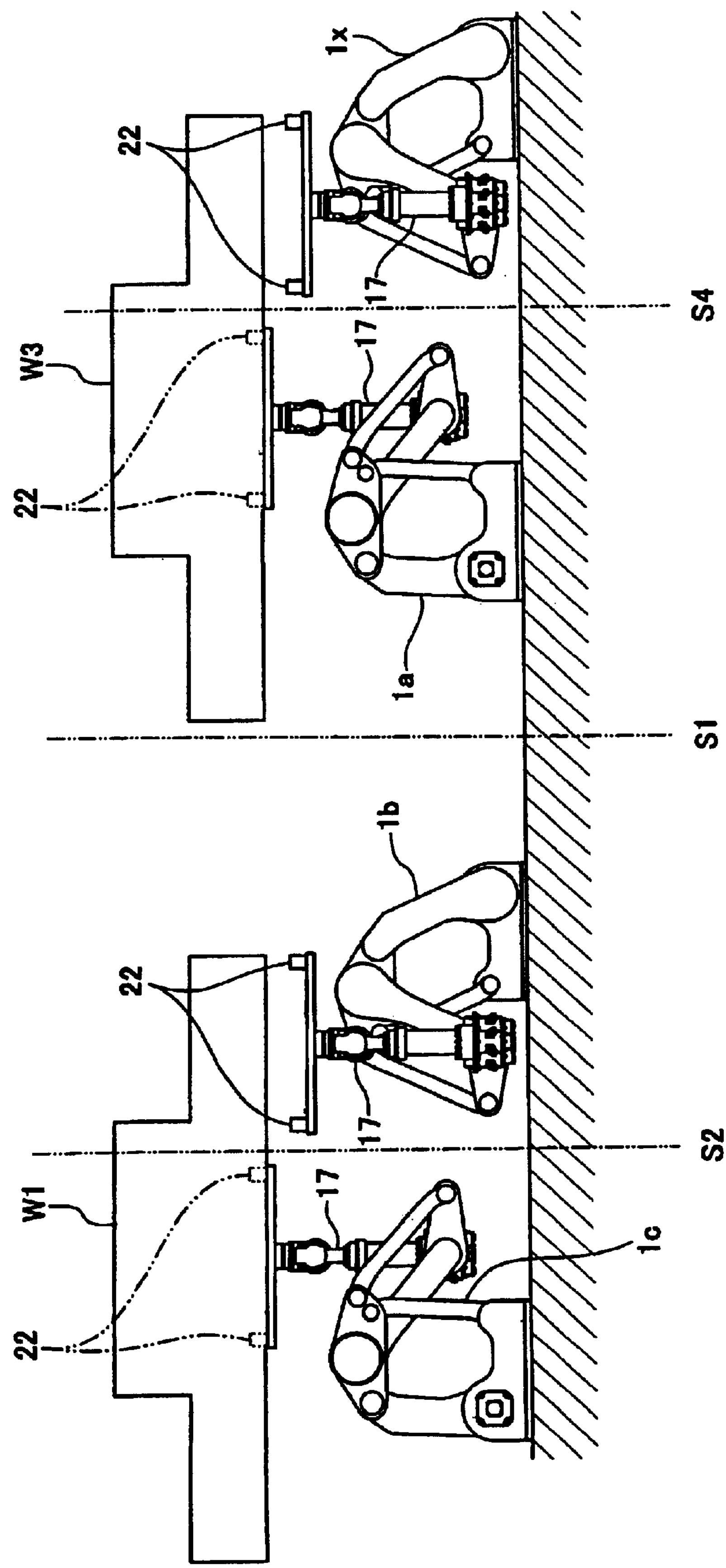
FIG. 9 is a front side view showing operations of the respective robots in the example in which the robot according to the present embodiment is applied to the manufacturing facility of automobiles.

The stages S2, S4 are stages for conveyance, and hence machining robots are not disposed in the surrounding areas of the stages S2, S4. Accordingly, upon the completion of conveyance of the works W1, W3 to the stages S2, S4, the works W1, W3 are conveyed to next process stages as they are (FIG. 9). The robots 1*a*, 1*c* convey the works W3, W1 to the stages S1, S3 through the conveying operation described above. Also, the robots 1*b*, 1*x* move the arms 17 to the upstream side to engage the engaging portions 22 in a work conveyed from the upstream side for support.

With the constitution described above, an existing manufacturing facility can be converted into a facility capable of easily handling a various kinds of work without dramatically modifying the existing manufacturing facility.

While, in the present embodiment, description is made to the case where one robot 1 (1*a*, 1*b*, 1*c*, 1*d*, 1*x*) is equipped with one robot arm mechanism, the present invention is not limited by this embodiment. And, one robot may be equipped with a plurality of robot arm mechanisms, and a work may be exchanged between any of the robot arms of one robot.

The robot arm mechanism according to the present invention is constituted such that a first and a second quadric crank chains (parallel link mechanisms 6, 11) are driven by a first and a second driving portions (driving portions 13, 16) to convey an object (work), thereby eliminating a need for providing a traveling axis that requires a high installing accuracy.

Furthermore, the object can be conveyed while being supported and remained to be in the supported state at a conveying end, thereby allowing the subject as is to be presented for machining. Therefore, a jig such as pallet is not necessary for positioning and fixing the work. Accordingly, a trouble, such as circulating the pallet through a machining process, can be eliminated.

Still furthermore, the joint in the quadric crank chain is driven to convey the object, thereby increasing the conveyable mass capacity with the following reasons.

Figure 10A:
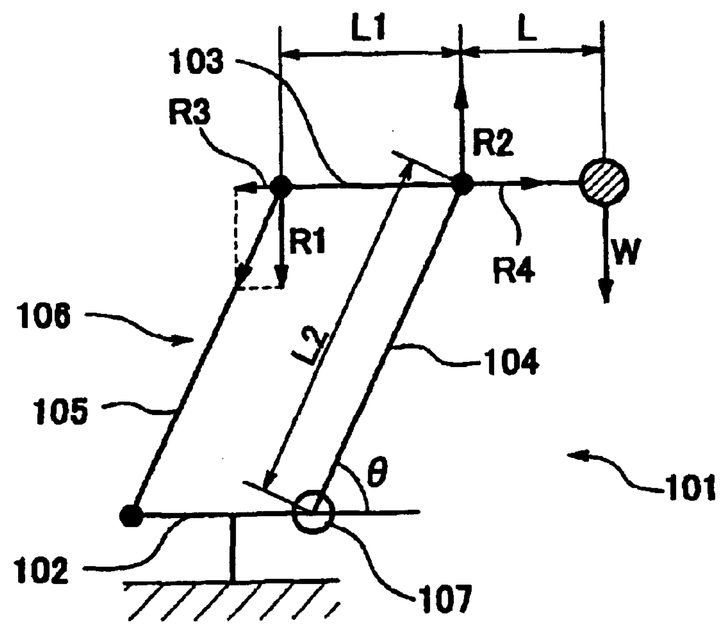
FIG. 10*a* is a view schematically showing a robot arm mechanism having a quadric crank chain.
Figure 10B:
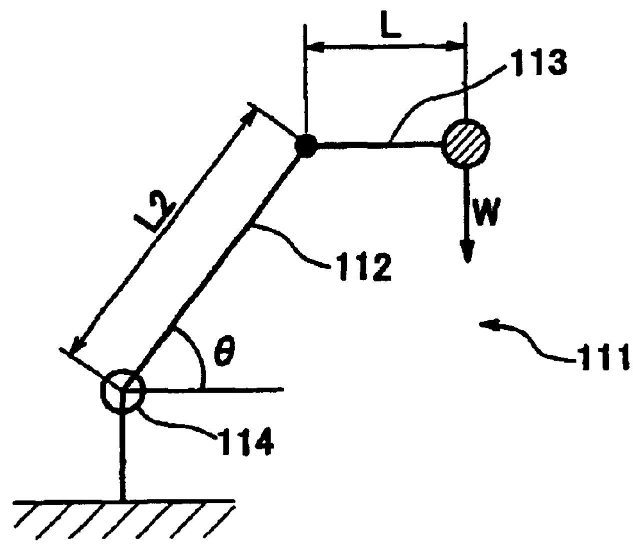
FIG. 10*b* is a view schematically showing a robot arm mechanism having a direct acting link mechanism.

FIGS. 10 are views schematically showing a model robot arm mechanism, in which FIG. 10*a* is a view showing a robot arm having a quadric crank chain, and FIG. 10*b* is a view showing a robot arm having a direct acting link mechanism. A robot arm 101 shown in FIG. 10*a* has a quadric crank chain 106 constituted by a lower link 102, an upper link 103, and links 104, 105 coupling the lower link 102 and the upper link 103. The quadric crank chain 106 is a parallel link mechanism for the simplicity of description. The lower link 102 is disposed horizontally, and a joint 107 between the lower link 102 and the link 104 is driven. The upper link 103 extends from a joint with the link 104 by a length L, and a mass W is attached to a tip end of the upper link 103. For the simplicity of description, the lower link 102, the upper link 103, and the links 104, 105 are assumed not to possess any mass.

In this case, Formulae (1), (2) are derived by balancing moments:

$$R1 = L \cdot W / L1 \quad (1), \text{ and}$$

$$R2 = (L1 + L) \cdot W / L1 \quad (2),$$

where R1 is a force acting on the joint between the upper link 103 and the link 105 in the vertical direction, R2 is a force acting on the joint between the upper link 103 and the link 104 in the vertical direction, and L1 is a link length of the upper link 103.

Furthermore, Formula (3) is derived because only a pulling force is exerted on the link 105 in the axial direction:

$$R3 = R1 / \tan\theta \quad (3),$$

where R3 is a force acting on the joint between the upper link 103 and the link 105 in the horizontal direction, and θ is an angle between the link 104 and the horizontal surface.

Still furthermore, Formula (4) is derived by balancing in the horizontal direction:

$$R4 = R3 \quad (4),$$

where R4 is a force acting on the joint between the upper link 103 and the link 104 in the horizontal direction Therefore, a torque T acting on a joint 7 is expressed as Formula (5):

$$T = R2 \cdot L2 \cdot \cos\theta - R4 \cdot L2 \cdot \sin\theta = W \cdot L2 \cdot \cos\theta, \quad (5)$$

where L2 is a link length of the link 104.

Accordingly, in the case of the robot arm 101 having the quadric crank chain 106, the torque T is obtained not based on a center of mass of the upper link 103 but through simplification by using a model in which the mass W is provided at the tip end of the link 104.

On the other hand, a robot arm 111 shown in FIG. 10*b* has a structure in which a link 112 having a length L2 and a link 113 having a length L are connected to each other in series, i.e., a structure substantially similar to a structure in which the link 102 and link 105 are removed from the robot arm 101. In addition, a joint 114 at a base end of the link 112 and a joint between the links 112, 113 are configured to be driven, and a mass W is attached to a tip end of the link 113. A torque T1 acting on the joint 114 of the robot arm 111 is expressed as Formula (6):

$$T1 = W \cdot (L2 \cdot \cos\theta + L) \quad (6)$$

Therefore, a robot arm having the quadric crank chain requires a smaller torque acting on a joint to be driven than a robot arm having a direct acting link mechanism. This effect becomes larger as the center of mass of the upper link 103 is farther away from the joint 107, i.e., as L becomes larger and as the links 104, 105 are more in an upright posture, i.e., as θ becomes closer to 90 degrees. For this reason, in the case where the joint 107 and the joint 114 are driven by driving sources having the same output level, the robot arm 101 can convey larger mass capacity than the robot arm 111.

Also, in the present embodiment, the first and the second quadric crank chains are respectively constituted by the parallel link mechanisms 6, 11, thereby simplifying the constitution of the robot arm. Consequently, the robot arm can be more easily controlled.

In the present invention, in the case where the lengths of the links (the arm 4 and the auxiliary link 5) coupled to the upper link and the lower link in the first quadric crank chain (the parallel link mechanism 6) are longer than the lengths of the links (the arm 9 and the auxiliary link 10) coupled to the upper link and the lower link in the second quadric crank chain (the parallel link mechanism 11), the first quadric crank chain does not have to be disposed away from an installing surface for the purpose of ensuring an operating range in the second quadric crank chain. Therefore, the first quadric crank chain can be disposed at a position as close to the installing surface as possible. Consequently, the height of a robot having such a robot arm mechanism can be made to be as short as possible.

Furthermore, in the case where two robot arms operate cooperatively and one of the two robot arms transfers an object to the other of the two robot arms, an interference between the robot arms and the object can be avoided with the following reasons.

In the present invention, in the case where, similarly to the robot 1 of the present embodiment, the upper link (the upper link 8) in the second quadric crank chain (the parallel link mechanism 11) is disposed more upwardly by a predetermined distance than the upper link (the upper link 3) in the first quadric crank chain (the parallel link mechanism 6), an interference between two robot arms and an object can be avoided with the following reasons when the robot arms operate cooperatively, and one of the robot arms transfers the object to the other of the robot arms.

Figure 11:
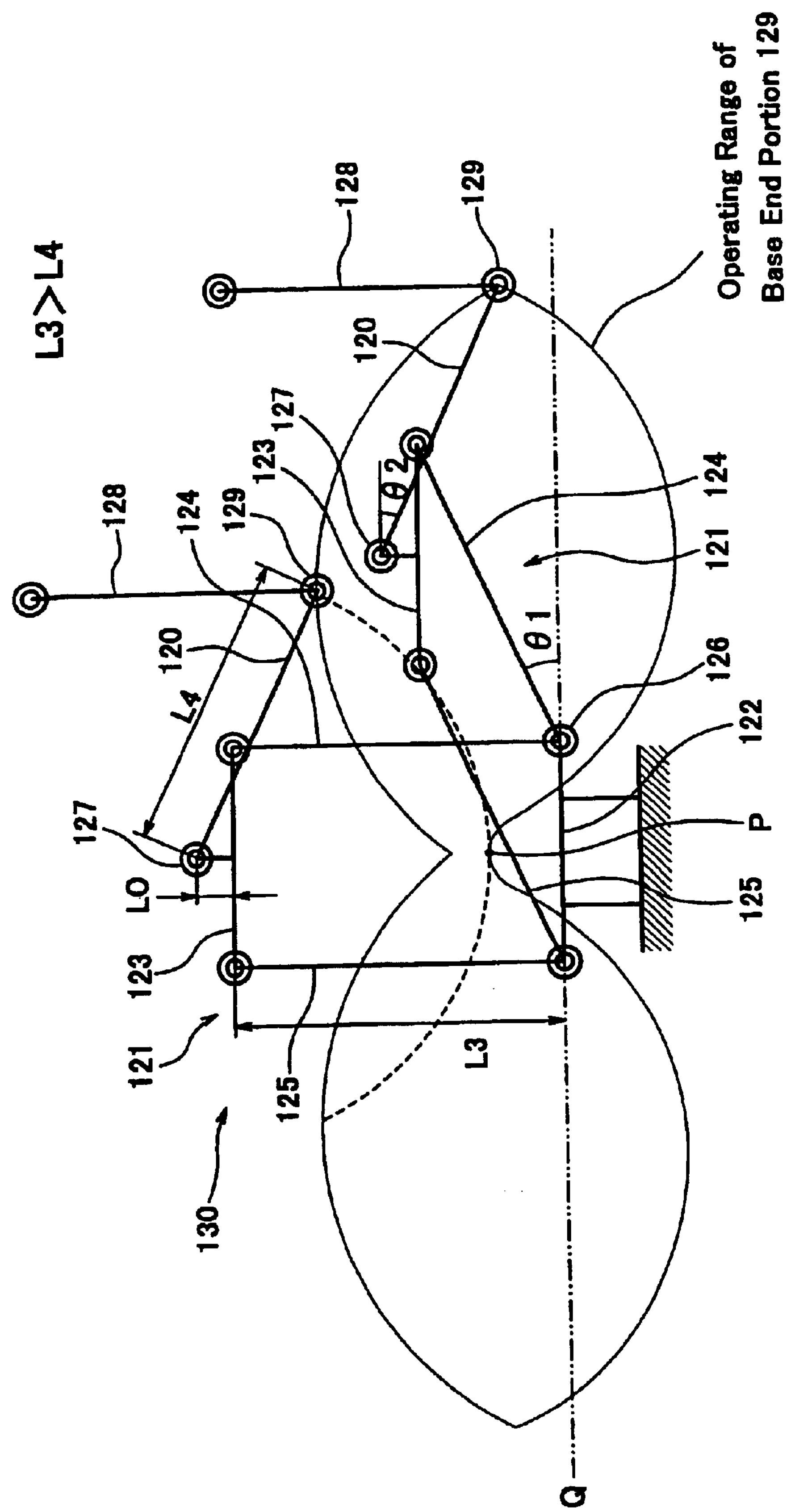
FIG. 11 is a view schematically showing an operating range of a supporting portion of a robot arm mechanism according to the present invention in the case where a length of a link driven by a first driving portion is longer than that of a link driven by a second driving portion.
Figure 12:
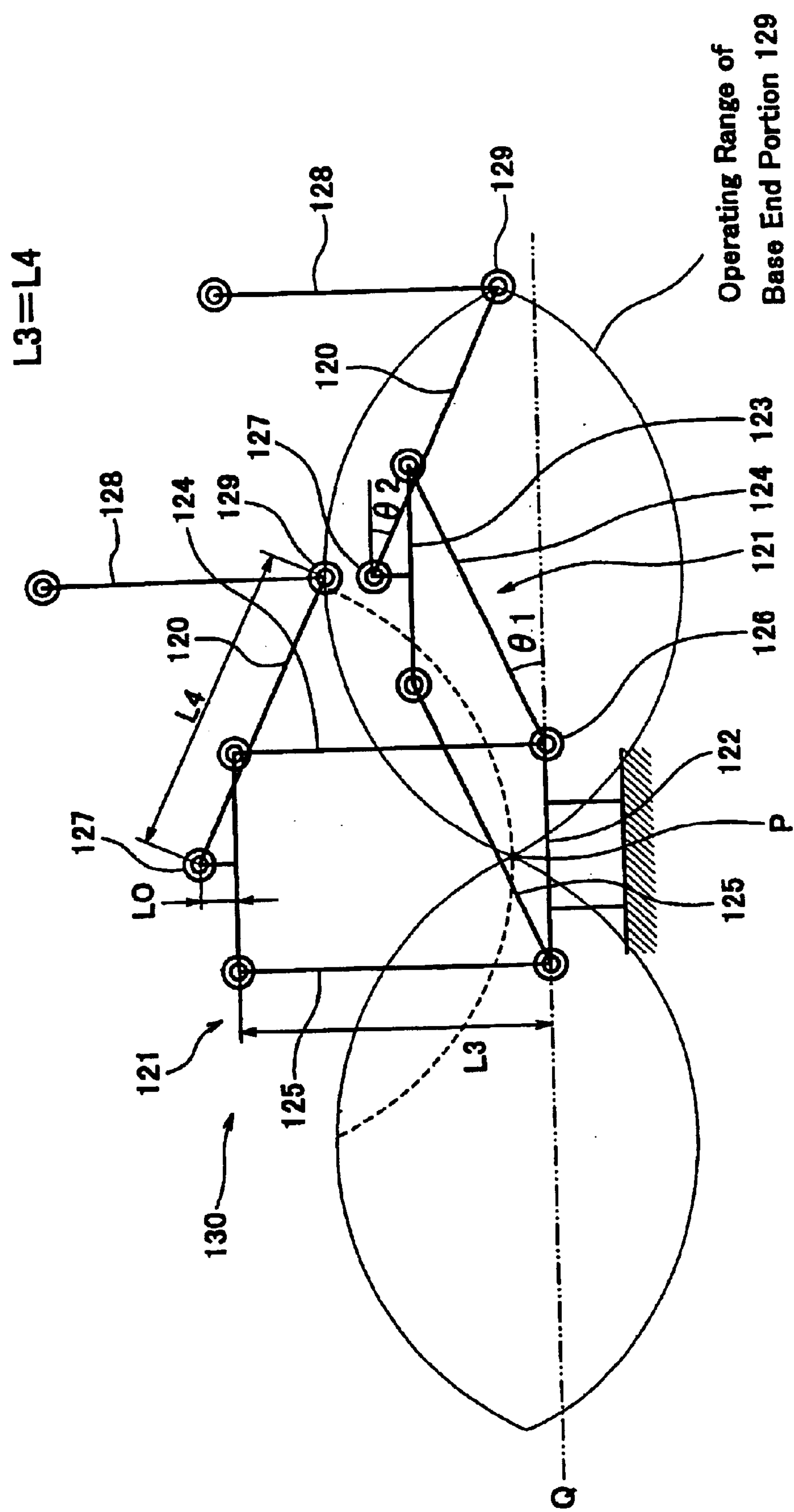
FIG. 12 is a view schematically showing an operating range of a supporting portion of a robot arm mechanism according to the present invention in the case where a length of a link driven by the first driving portion is equal to that of a link driven by the second driving portion.
Figure 13:
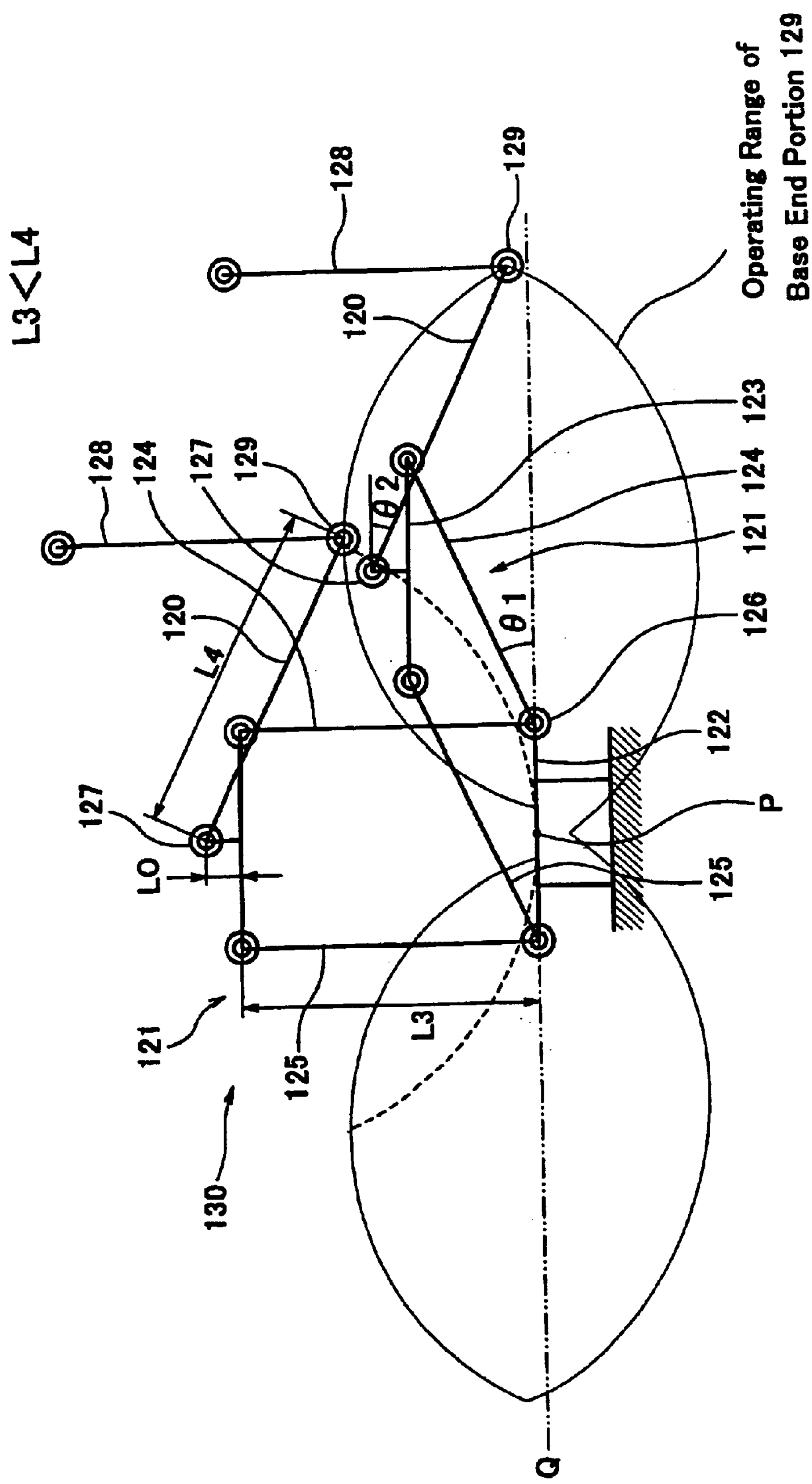
FIG. 13 is a view schematically showing an operating range of a supporting portion of a robot arm mechanism according to the present invention in the case where a length of a link driven by the first driving portion is shorter than that of a link driven by the second driving portion.

FIGS. 11 to 13 are views schematically showing an operating range of a robot arm mechanism of the present invention. FIG. 11 shows an operating range of a supporting portion in the case where the length of a link driven by a first driving portion is longer than the length of a link driven by a second driving portion. FIG. 12 shows an operating range of a supporting portion in the case where the length of a link driven by the first driving portion is equal to the length of a link driven by the second driving portion. FIG. 13 shows an operating range of a supporting portion in the case where the length of a link driven by the first driving portion is shorter than the length of a link driven by the second driving portion. It should be noted that in FIGS. 11–13, for the purpose of simplifying the drawings, a first quadric crank chain is a parallel link mechanism, and, in addition, a second quadric crank chain is simplified, so that only a link 120 driven by a second driving portion is illustrated.

As shown in each of the drawings, the first quadric crank chain 121 comprises the lower link 122, the upper link 123, and the links 124, 125. The joint 126 between the lower link 122 and the link 124 is driven, and the joint 127 at the base end of the link 120 is driven. Furthermore, the first quadric crank chain 121 can operate in a range from a state in which the links 124, 125 are inclined by an angle of θ 1 with respect to the horizontal surface to a state in which the links 124, 125 are inclined by 180°−θ 1 with respect to the horizontal surface. In addition, the joint 127 of the link 120 is provided farther upwardly from the upper link 123 by an offset amount L0. The operating range of the link 120 is from a state in which the link 120 is inclined by θ 2 with respect to the horizontal surface to a state in which the link 120 is inclined by 180°−θ 2 with respect to the horizontal surface.

A case where the link length L3 of the link 124 is longer than the link length L4 of the link 120 will be described with reference to FIG. 11. In this case, an operating range of a base end portion 129 of the supporting portion 128 is shown in the drawing. In the case where the links 124, 125 are placed in an upright position, and the link 120 is move around the joint 127 from right (left) to left (right) in the drawing to convey an object, the base end portion 129 passes along a passage indicated by a wave line in the drawing. The lowest position in the passage is a position P. Accordingly, during such an operation, the object is at the lowest position when the base end portion 129 passes the position P.

Such an operation frequently occurs, for example, when the object is transferred from a robot arm (not shown) disposed on the right side (left side) of the robot arm 130 to the robot arm 130, and further the object is transferred from the robot arm 130 to a robot arm (not shown) disposed on the left side (right side) of the robot arm 130. If the size of the object is larger than that of the robot arm 130, it is necessary to prevent a tip end of a supporting portion of a robot arm adjacent the robot arm from interfering with the object. Therefore, the base end of the supporting portion of the adjacent robot arm must be located in a position lower than the position P.

By the way, since the base end portion 129 of the supporting portion 128 substantially has a predetermined size, a practical lower limit position Q (chain double-dashed line in the drawing) of the operating range of the base end portion 129 is determined so as to prevent the end base portion 129 from interfering with the installing surface based on such a size. Therefore, it is more advantageous to have a longer separation distance between the position P and the lower limit position Q for the purpose of preventing the supporting portion from interfering with the object.

Next, a case where the link length L3 of the link 124 is equal to the link length L4 of the link 120 will be described with reference to FIG. 12. In this case, the operating range is shown in the drawing. The separation distance between the position P and the lower limit position Q is shorter, compared with the case where L3 is larger than L4.

In addition, a case where L3 is smaller than L4 will be described with reference to FIG. 13. In the case of FIG. 13, the position P is identical to the lower limit position Q, and therefore, the interference between the supporting portion and the object can not be avoided.

As shown in the preceding description, in the case where the link length L3 of the link 124 is longer than the link length L4 of the link 120, the operating range of the supporting portion is sufficiently wide, and therefore the above case offers an advantageous of avoiding the interference between the supporting portion and the object. A separation distance between the position P and the lower limit position Q can also be ensured by increasing the offset amount LO.

In the present embodiment, since the supporting portion of the present invention is the arm 17 extended vertically upwardly from the lower link 7, it is possible to prevent an undesirable torque from acting on a connecting portion between the arm 17 and the lower link 7 in the parallel link mechanism 11 (the second quadric crank chain).

Furthermore, since the length of the arm 17 is longer than the lengths of the arm 9 and the auxiliary link 10, the position of the tip end of the arm 17 can be set to higher than the positions of the parallel link mechanisms 6, 11, thereby making it possible to support the object in a state in which the complete robot arm is placed under the object.

Still furthermore, since the arm 17 possesses the joints 17*a*–17*c* for moving supported objects, the joints 17*a*–17*c* can be driven to adjust the position of an object, thereby alleviating the accuracy required for mounting the robot 1 on the installing surface.

In the present invention, in the case where a supporting portion (the arm 17) comprises, at an upper end thereof, a supporting member (the supporting member 19) for supporting an object at a plurality of portions, and the supporting portions for an object can be changed in a direction intersecting with the conveying direction and/or in the conveying direction, the same supporting member can be used to support various kinds of objects by changing the supporting portions, thereby eliminating a need to prepare a dedicated supporting member for each kind of object.

Numerous modifications and alternative embodiments of the invention will be apparent to those skilled in the art in view of the forgoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A robot arm mechanism used for a robot that conveys an object and supports the object at a conveying end comprising:

- a first quadric crank chain having a lower link and an upper link, the lower link and the upper link being coupled with each other through links;
- a first driving portion for driving a joint of the lower link in the first quadric crank chain;
- a second quadric crank chain having a lower link and upper link fixed on the upper link in the first quadric crank chain, the lower link and the upper link being coupled with each other through links;

a second driving portion for driving a joint of the upper link in the second quadric crank chain; and a supporting portion fixed on the lower link in the second quadric crank chain and holding up an object from below for support.

2. The robot arm mechanism according to claim 1, wherein the first and the second quadric crank chains are respectively constituted by parallel link mechanisms.

3. The robot arm mechanism according to claim 2, wherein the length of the links coupling the upper link and the lower link in the first quadric crank chain is longer than the length of the links coupling the upper link and the lower link in the second quadric crank chain.

4. The robot arm mechanism according to claim 2, wherein the upper link in the second quadric crank chain is disposed farther upwardly than the upper link in the first quadric crank chain by a predetermined distance.

5. The robot arm mechanism according to claim 2, wherein the supporting portion extends vertically upwardly from the lower link and is arm-shaped.

6. The robot arm mechanism according to claim 5, wherein the length of the supporting portion is longer than the length of the links coupling the upper link and the lower link in the second quadric crank chain.

7. The robot arm mechanism according to claim 1, wherein the supporting portion has a joint for moving a supported object.

8. The robot arm mechanism according to claim 1, wherein the supporting portion has, at its upper end, a supporting member for supporting an object at a plurality of portions.

9. The robot arm mechanism according to claim 8, wherein the supporting member is constituted such that the supporting portions for the object can be changed in a direction intersecting with the conveying direction.

10. The robot arm mechanism according to claim 8, wherein the supporting member is constituted such that the supporting portions for the object can be changed in the conveying direction.

* * * * *